Patented Sept. 19, 1944

2,358,525

UNITED STATES PATENT OFFICE 2,358,525

ESTERS OF THE DIHYDRO-ESTRINE SERIES AND PROCESS OF MAKING SAME

Karl Miescher, Riehen, and Caesar Scholz, Basel, Switzerland, assignors, by mesne assignments, to Ciba Pharmaceutical Products, Incorporated, Summit, N. J., a corporation of New Jersey No Drawing. Application July 19, 1938, Serial No. 220,123. In Switzerland September 27, 1937

5 Claims. (Cl. 260—397.5)

It has not hitherto been possible to produce esters having free phenolic hydroxyl groups by reaction of a halide of an organic acid with a compound of the dihydro-estrine series. Our experiments have shown that when acetyl chloride or benzoyl chloride is used, then, according to the temperature applied, there is either in the main no reaction or all the hydroxyl groups are together esterified, the latter happening even when the operation is conducted in presence of a tertiary base.

This invention relates to a process by which new esters of the dihydro-estrine series having free phenolic hydroxyl groups are surprisingly produced by causing a compound of the dihydro-estrine series to react in presence of an indifferent organic solvent with a carbonyl halide even when this is used in large excess. The halogen carbonate thus obtained may, if desired, be caused to react, for example, with a compound containing hydroxyl groups and an amine, for instance an alcohol, a phenol, diethylamine, ammonia, an amino-alcohol, for instance diethylaminoethanol, a diamine, for instance diethylaminoethylamine or the like. In presence of a tertiary base carbonyl halides, like halides of organic acids, attack all the hydroxyl groups simultaneously.

By compounds of the dihydro-estrine series are meant estradiol, estriol, dihydroequilenine and dihydroequiline. Among carbonyl halides are included for example, phosgene and carbonyl bromide.

Indifferent organic solvents for the process are, for instance, dioxane, benzene, toluene, chloroform, ethylenechloride or the like.

The new compounds are useful in therapeutics or as intermediate products for the production of therapeutic agents.

The following example illustrates the invention:

Into an ice-cold solution of 0.2 part by weight of estradiol in 5 parts of dioxane there are passed 3.75 parts of phosgene and the whole is allowed to stand for some hours at room temperature. The solvent is then removed in a vacuum. The residue is estradiol-17-monochlorocarbonate. It forms white crystals.

When this compound is heated for a short time with methanol and the mixture is cooled and diluted with a little water and filtered there is obtained on the filter estradiol-17-monomethylcarbonate which may be recrystallized from methanol. Melting point 216.5–218° C.

In analogous manner other derivatives are obtained, for example the estradiol-17-mono-ethyl-carbonate of melting point 171–172° C., the estradiol-17-diethylaminoethylcarbonate or the like.

In quite similar manner there are for example also obtained 16:17-dihalogen carbonates of estriol and 17-halogen carbonates of dihydroequilenine and dihydroequiline as well as the reaction products thereof with alcohols, amines, amino-alcohols and the like.

What we claim is:

1. A process for the manufacture of new esters of the dihydro-estrine series consisting of estradiol, estriol, dihydroequilenine and dihydroequiline having free phenolic hydroxyl groups, comprising causing a carbonyl halide to react with a compound of the dihydro-estrine series in presence of an indifferent organic solvent.

2. A process for the manufacture of new esters of the dihydro-estrine series consisting of estradiol, estriol, dihydroequilenine and dihydroequiline having free phenolic hydroxyl groups, comprising causing a carbonyl halide to react with a compound of the dihydro-estrine series in presence of an indifferent organic solvent, and causing the compounds thus obtained to react with a member of the group consisting of a compound containing hydroxyl groups and an amine.

3. A process for the manufacture of new esters of the dihydro-estrine series consisting of estradiol, estriol, dihydroequilenine and dihydroequiline having free phenolic hydroxyl groups, comprising causing a carbonyl halide to react with a compound of the dihydro-estrine series in presence of an indifferent organic solvent, and causing the compounds thus obtained to react with an alcohol.

4. A processs for the manufacture of new esters of the dihydro-estrine series consisting of estradiol, estriol, dihydroequilenine and dihydroequiline having free phenolic hydroxyl groups, comprising causing phosgene to react with a compound of the dihydro-estrine series in presence of an indifferent organic solvent.

5. The new estradiol ester of the formula

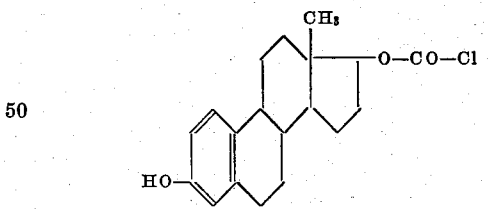

KARL MIESCHER.
CAESAR SCHOLZ.